United States Patent [19]

Letourneux et al.

[11] Patent Number: 5,266,201
[45] Date of Patent: Nov. 30, 1993

[54] PROCESS FOR THE PURIFICATION OF AQUEOUS SOLUTIONS POLLUTED BY NITRATE IONS

[75] Inventors: Jean-Pierre Letourneux, Montelimar; Alain Bourdeau, Pierrelatte, both of France

[73] Assignee: Lafarge Fondu International, Neuilly sur Seine, France

[21] Appl. No.: 53,978

[22] Filed: Apr. 26, 1993

Related U.S. Application Data

[63] Continuation of Ser. No. 817,808, Jan. 8, 1992, abandoned.

[30] Foreign Application Priority Data

Jan. 8, 1991 [FR] France ............... 91 00260

[51] Int. Cl.$^5$ ............... C02F 3/00; C02F 1/58
[52] U.S. Cl. ............... 210/620; 210/631; 210/714; 210/724; 210/726; 210/730; 210/734; 210/903; 210/916; 210/917; 423/119; 423/125; 423/397; 71/58
[58] Field of Search ............... 210/620, 631, 702, 714, 210/726, 730, 731, 734, 738, 724; 423/115, 119, 122, 125, 127, 395, 397

[56] References Cited

U.S. PATENT DOCUMENTS

| | | | |
|---|---|---|---|
| 3,617,579 | 11/1971 | Gunderloy, Jr. et al. | 210/903 |
| 4,045,341 | 8/1977 | Tsuruta et al. | 210/903 |
| 4,267,057 | 5/1981 | Hager et al. | 210/903 |
| 4,268,397 | 5/1981 | Horie et al. | 210/903 |

FOREIGN PATENT DOCUMENTS 3711356 10/1988 Fed. Rep. of Germany .
53-049858 5/1978 Japan .

OTHER PUBLICATIONS

Chemical Abstracts, vol. 91, No. 26, abstract No. 221583, Dec. 24, 1979.
Chemical Abstracts, vol. 111, No. 26, abstract No. 238985, Dec. 25, 1989.

*Primary Examiner*—Neil M. McCarthy
*Attorney, Agent, or Firm*—Millen, White, Zelano & Branigan

[57] ABSTRACT

The invention relates to a process for the purification of aqueous solutions polluted by nitrate ions. This process is characterised in that it consists in precipitating hydrated double or mixed calcium nitroaluminates, such as, in particular, hydrated calcium mononitroaluminate, by adding at least one agent supplying the element aluminium and at least one agent supplying the element calcium to the solutions to be treated, the overall mole ratio of the element aluminium to nitrate, $Al/NO_3$, being superior to 1 and the overall mole ratio of calcium to nitrate, $Ca/NO_3$, being superior to 2, and in that the precipitation reaction is performed with stirring and at a basic pH, preferably above 10.5.

The process according to the invention is intende, in particular, to the treatment of polluted waters such as municipal waste water and factory effluents and to the treatment of liquid manure.

32 Claims, No Drawings

PROCESS FOR THE PURIFICATION OF AQUEOUS SOLUTIONS POLLUTED BY NITRATE IONS

This application is a continuation of application Ser. No. 07/817,808, filed Jan. 8, 1992, abandoned.

BACKGROUND OF THE INVENTION

This invention relates to a process for the purification of aqueous solutions polluted by nitrate ions.

The invention also relates to recycling of the solid compounds emanating from the above-mentioned purification process, preferably in the field of fertilizers when the bound nitrate content is sufficient.

Nitric acid is one the most widely used mineral acids. Nitric acid is used on a very large scale in the chemical industry, predominantly for the manufacture of artificial fertilizers, particular in the form of ammonium nitrate. Nitric acid, in addition, is of very great importance in the synthesis of many explosives.

The salts of nitric acid, nitrates, are also well known and widely used in the chemical and metallurgical industries.

The use of nitric acid or its salts is accompanied, in most cases, by the discharge of effluents containing nitrate ions. Industrial facilities also discharges various other forms of nitrogen which may be converted into nitrates: ammoniacal nitrogen is discharged, in particular by coking plants, and nitrogenous organic compounds are discharged, in particular, by the agri-foodstuffs plants.

Nitrates can have a natural origin, such as in the form of deposits of salts, generally of sodium nitrate.

Nitrates can also emanate from the conversion of ammoniacal nitrogen by biochemical nitrification. Liquid manure constitutes one of the raw materials richest in ammoniacal nitrogen: approximately half the nitrogen present in liquid manure is in organic form, and approximately half in ammoniacal form (that is on the order of 2 to 3.5 g/l of $NH_4^+$). In smaller proportions, municipal waste water also contains ammoniacal nitrogen which can likewise be converted into nitrates biochemically.

To accomplish nitrification biochemically, it can be sufficient to aerate the liquid manure when the latter naturally contains the appropriate bacteria. The nitrogen present in liquid manure is modified to only slightly during storage of the liquid manure; at the very most, a slight loss takes place through outgassing of ammonia. Spreading on the ground causes mineralization of the readily decomposable organic matter and nitrification of $NH_4^+$. The nitrates produced may be used by plants, assimilated by microorganisms or leached in depth into the soil beyond the root absorption zone; they are then lost to the plant and contribute, to long or short term pollution of groundwater.

Whether of synthetic or natural origin and irrespective of the chemical nature of the counter anion, nitrates are, for the most part, soluble in aqueous media in high proportions. As an example, solubility in water of calcium nitrate, $Ca(NO_3)_2$, reaches 1.212 kg per liter at 18° C. and that of sodium nitrate, $NaNO_3$, reaches 0.921 kg per liter at 25° C.

The presence of ever increasing amounts of nitrates in the natural environment constitutes a matter growing of concern. It is known that, taken in repeated small doses, nitrates are potentially toxic due to the possible conversion of nitrates to nitrates, which can cause fatal methemoglobinemia in young children, and to nitrosamines, which are reputedly carcinogenic. For this reason, doctors recommend giving only water free from nitrate ions to young children. In point of fact, as a result of their high solubility in aqueous media, the concentration of nitrates, whether they originate from discharges of industrial effluents, from municipal waste water or from chemical or natural fertilizers (spreading of liquid manure), is gradually increasing in surface water and groundwater which, in some instances, has become unfit for human consumption.

The nitrate concentration is limited to 50 mg per liter in drinking water in France and in the European Community in general. However, as a result of the lack of a purification plant suited to the removal of nitrates on French territory, nitrate ion concentrations which can range up to 100 mg per liter can be found in some drinking water supplied to the water.

To solve this problem, various purification processes are currently in use for the treatment of water intended for human consumption. However, no economically advantageous process that can be implemented on an industrial scale exists for the treatment of effluents highly polluted with nitrates, such as liquid manure.

One type of process used for obtaining drinking water by physicochemical means involves the removal of nitrate ions by denitration with an ion exchange resin. This process requires water possessing a content of suspended solid matter of less than 1 mg per liter; otherwise, the water to be treated must first be subjected to sieving, followed by one or more flocculation, filtration and/or settling, and physical separation, operations.

The ion exchange resin retains the nitrate ions, as well as sulfate ions, chloride ions and hydrogencarbonate ions.

A main drawback of this process is that it cannot be used if there is an excessive amount of ions and chloride ions in the water, which have affinities which are, respectively, much greater than and similar to that of nitrates for the resins. Since regeneration of the resins is generally carried out with sodium chloride, a replacement of the nitrate ions by chloride ions takes place during the purification process. This results in an increase in the chloride ion content in the water treated by this process. Another major drawback of this process involves the disposal of the eluates which are rich in chlorides, nitrates, and often sulfates, obtained after regeneration of the resins. If the concentrations are not too high, they go into the nearest stream. In the other cases, they are either sent to the nearest biological purification plant or stored.

In another type of biological process, nitrate ions are removed using bound bacteria capable of metabolizing these ions. Usually, heterotrophic bacteria drawing their energy from a carbonaceous nutrient, such as ethanol or acetic acid, are used. By this process, the nitrate ions are converted into gaseous nitrogen. Proliferation of the bacteria leads to an excess of biomass or sludge, which can be treated with municipal sludges or incinerated.

This process can be used only at temperatures above 8°–10° C. In addition, these temperatures must be stable during the treatment; otherwise, control of the process is complex. This process is consequently relatively expensive to perform.

SUMMARY OF THE INVENTION

An aim of the present invention is to propose a process for the purification of aqueous solutions polluted by nitrate ions which is simple, effective and relatively inexpensive to perform.

Another aim of the invention is to recycle the compounds containing nitrate ions and resulting from this process preferably in the fertilizer sphere, without polluting the environment.

According to the invention, to achieve these aims, a process is provided for the purification of aqueous solution polluted by nitrate ions, comprising precipitating hydrated double or mixed calcium nitroaluminates, such as, in particular, hydrated calcium mononitroaluminate —3 $CaO.Al_2O_3.Ca(NO_3)_2.nH_2O$— by adding to the solutions to be treated at least one agent supplying the element aluminum, this agent being referred to as "active alumina", and at least one agent supplying the element calcium, the overall molar ratio of aluminium to nitrate, $Al/NO_3$, being superior to 1 and the overall molar ratio of calcium to nitrate, $Ca/NO_3$, being superior to 2. The precipitation reaction is performed with stirring at basic pH, preferably above 10.5, and, where appropriate, the precipitate obtained is removed, for example, by flocculation followed by one or more settling and physical separation and/or filtration operation(s).

In spite of variety of the compounds contained in the solutions to be treated, and therefore the reactions that can compete with the formation of hydrated calcium nitro-aluminate, the elimination of the nitrate ions, with the help of the invention process, is wholly satisfactory.

The process according to the invention is advantageous in more than one respect: apart from a trapping of a large proportion of the nitrate ions in the form of hydrated double or mixed calcium nitroaluminates, this process makes it possible to remove a large part of the undesirable cations in hydroxide form, as well as undesirable anions forming insoluble precipitates in the presence of the element calcium, or forming complex calcium aluminate such as carbonates, sulfates and chlorides.

Advantageously, the process according to the invention is carried out at room temperature, that is, at below 20° C. or approaching 30° C. to 40° C. according to the season. Preferably, the process according to the invention is implemented at a temperature of about 20° C., and more preferably at a temperature less than 20° C. Under those conditions, although the starting kinetic of the reaction is slower, on the other hand, the yields at those temperatures are better.

Where appropriate, prior to separation of the nitrate ions, various chemical treatments may be performed to remove other undesirable compounds included in the effluent to be treated.

Where the effluents to be treated comprise suspended solid matter, it is possible to perform one or more precipitation(s) of this matter by flocculation, for example, using an addition of ferric chloride and a base, or using aluminum sulfate, or alternatively using an organic flocculating agent, such as polyacrylamides, this precipitation being followed by one or more filtration operation(s) and/or settling and physical separation operation(s).

Where the effluents to be treated comprise undesirable anions or components forming insoluble calcium salts, precipitation of these components is advantageously performed by adding an agent supplying the element calcium, and the precipitated phases obtained are then removed before removal of the nitrates.

Preferably, this precipitation is performed using calcium hydroxide. This operation results in a lowering of the concentration of anions which are only sparingly soluble in the form of calcium salts, such as sulfates, phosphates, carbonates, fluorides, and the like. The removal of these anions makes it possible to limit the formation of other complex aluminates, concomitantly with the hydrated calcium nitroaluminates.

Where the effluents to be treated comprise undesirable cations or components forming hydroxides which are only sparingly soluble or insoluble, precipitation of these components is advantageously performed by adding a basic agent. Preferably, this precipitation is performed using calcium hydroxide. This operation results in a lowering of the concentration of anions which are only sparingly soluble in the form of calcium salts, as well as that of cations which are only sparingly soluble, such as lead, etc., in hydroxide form. After removal of the precipitated phases obtained, the the nitrates are removed.

The process according to the invention may be performed using various sources of active alumina, employed alone or in combination, for example, aluminates, particularly alkali metal aluminates; calcium aluminates constituting certain cements, such as $CA_2$, $CA$, $C_{12}A_7$; and $C_3A$, and calcium aluminoferrites. In the foregoing formulae and following description:

C represents CaO,
A represents $Al_2O_3$,
H represents $H_2O$.

Preferable calcium aluminates are those obtained by a sintering process rather than those obtained by a fusion process. In fact, the calcium aluminates emanating from a sintering process generally possess a better capacity for being ground as well as greater reactivity.

Hydrated calcium aluminates, such as $C_4AH_{13}$, can also lead to the formation of complex aluminates by ion exchange. Aluminous cements bearing the trade names FONDU, SECAR, LDSF as well as cubic-T are also suitable: the latter is a cubic calcium aluminate, $C_3AH_6$, decomposed thermally at approximately 300° C. to $C_{12}A_7$ and $Ca(OH)_2$. This product possesses directly the stoichiometry needed for the formation of complex aluminates (C/A=3) in the case of a reaction with a calcium salt.

Also preferable are, products comprising $C_3A$ and/or $C_{12}A_7$, employed alone or in combination with other compounds with which greater reactivities as well as high yields in short periods of time, on the order of 1 to 3 hours, have been observed.

The yields are further improved when employing as reagents $C_3A$ and CaO. The best yields and reactivities have been obtained using the reagent, which corresponds to the product produced when making of $C_3A$ with an excess of lime.

It is preferable to work close to this theoretical stoichiometry in the first moments of formation of the calcium nitroaluminates. This stoichiometry corresponds to C/A=4 in the general case, and to C/A=3 for the treatment of a solution of a calcium salt.

The agent supplying the element calcium can be calcium hydroxide, or a calcium aluminate supplemented, if necessary, with a second agent supplying the element calcium, such as calcium hydroxide.

Advantageously, the reaction of aqueous solution polluted by nitrates according to the invention is initiated by means of addition of hydrated double or mixed calcium nitroaluminate at the beginning of the reaction in the proportion of approximately 10 to 50% by weight relative to the weight of calcium aluminate introduced.

Under these conditions, improvements have been observed in the rate of formation of hydrated double or mixed calcium nitroaluminates, principally during the initial phase of this reaction, and in the precipitation yield of the nitrates. The hydrated double or mixed calcium nitroaluminate, which is mainly to be formed during the reaction, is advantageously used as a seed.

The process according to the invention, as well as the different variants of this process described above, find an especially advantageous field of application for treating water loaded with nitrates and possibly with other inorganic compounds, such as industrial effluents and municipal waste water, as well as media loaded with ammonical nitrogen, the nitrogen being liable to be converted to nitrates such as liquid manure.

When the solution to be treated is a solution rich in nitrogen in ammoniacal form and in organic form, the present invention considerably reduces or even eliminates the pollutant power of these solutions. This applies in particular to raw materials, such as liquid manure, which generate solutions rich in nitrates through nitrification.

Liquid manure, in particular, is at present simply spread in the crude state; its high content of soluble nitrogen, chiefly in ammonium form, poses a risk of substantial pollution, especially when it is spread outside the periods of the year in which plants assimilate large amounts of nitrates needed for their growth. By means of a simple treatment of the liquid manure, prior to spreading and in accordance with the process according to the invention, the fertilizer qualities of the liquid manure are retained and/or improved while advantageously eliminating its capacity as a pollutant.

According to a first preferred embodiment of the invention, which relates especially to the treatment of solutions or suspensions comprising nitrogen in ammoniacal form, such as liquid manure, the following steps are performed successively:

1) The ammoniacal nitrogen present in the solutions to be treated is biochemically converted to nitrates in the presence of oxygen. For this purpose, the following procedure may be adopted. The solutions rich in ammoniacal nitrogen, such as liquid manure, are aerated and, if necessary, are inoculated with nitrifying microorganisms to induce nitrification.

2) Once the majority of the ammoniacal nitrogen is converted to nitrates, one or more calcium aluminates is/are added to the solution to be treated, so that the overall molar ratio of the aluminium to nitrate, Al/-$NO_3$, is superior to 1 and the overall molar ratio of the calcium to nitrate is superior to 2. If necessary, calcium hydroxide and/or another basic agent is also added to adjust the pH to a basic value, preferably to a value above 10.5, and the precipitation reaction is performed with stirring at room temperature.

3) After separation, for example, after settling has taken place or by filtration, a thick suspension or a solid is collected, which product is advantageously used as an enriching agent and fertilizer for agricultural soils.

4) Finally, a liquid effluent depleted in nitrates, the pollutant nature of which is greatly reduced in comparison with the initial liquid manure, is collected.

Thus, its discharge into the environment can be safely envisaged.

Apart from the removal of a large part of the nitrate ions, as well as ions forming insoluble hydroxides and insoluble calcium salts, the process according to the invention, in contrast to known processes, when applied to the treatment of liquid excrement, such as liquid manure, has the advantage of producing clear, decolorized and deodorized liquid effluents.

In point of fact, liquid excrement includes organic compounds of biliary origin, which are highly colored and whose coloration varies between yellow and brown hues and which, moreover, biodegrade with difficulty. It may hence be supposed that these colored organic compounds are bound in the hydrated calcium mononitroaluminate precipitate and/or the other precipitates which advantageously accompany the formation of this precipitate, namely insoluble hydroxides and insoluble calcium salts.

The alkalinity of the suspensions or solids obtained at the end of step (3) can enable an acid soil to be corrected. In addition, their content of sparingly soluble nitrate enables the nitrate fertilizer to be supplied at a rate proportional to its consumption by the plants, and thereby eliminates a source of pollution of groundwater and stream water.

In the nitrification according to step (1), ammoniacal nitrogen is biochemically converted to nitrate biochemically in the presence of nitrifying bacteria and oxygen, preferably supplied by aeration. This conversion is performed according to conventional working conditions.

It is generally accomplished in two stages by autotrophic microorganisms:

oxidation of ammoniacal nitrogen to nitrite by suitable microorganisms, e.g., microorganisms of the genus Nitrosomonas followed by oxidation of the nitrites to nitrates by suitable microorganisms, e.g., microorganisms of the genus Nitrobacter The nitrifying microorganisms may be found in water purification plant sludge or alternatively in partially or completely nitrified liquid manure.

The rate of nitrification depends, in particular, on the temperature; pH, which is preferably maintained at between 7.2 and 8; and the amount of oxygen which may be available to the microorganisms. It is also important to take care that the nitrification reaction medium does not contain organic or inorganic compounds capable of modifying or even inhibiting the growth of the microorganisms. For further details regarding the conditions necessary during nitrification, reference may be made to the work entitled "Mémento technique de l'eau" (Technical Handbook on Water), 9th edition, volume 1, pp. 300–301, published by DEGREMONT.

Advantageously, the adjustment to a basic pH for the requirements of the precipitation reaction of step (2) is performed using potassium hydroxide, in order to yield residual sludge rich in potassium, increasing its value as a fertilizer.

Advantageously, before the precipitation of hydrated double or mixed calcium nitroaluminates (step (2) of the first embodiment), either before or after nitrification step (1), the solid matter included in the liquid manure is at least partially separated, generally by flocculation followed by filtration and/or settling and physical separation from the solid matter, protein-rich matter, phosphates and nitrogen compounds which are only sparingly soluble in water are recovered.

Preferably, separation of the solid matter included in the liquid manure is performed before the nitrification step (1). If this is not done, the solid matter, which possesses a certain biochemical oxygen demand (BOD), disadvantageously competes with the nitrification reaction. The filtrate constituting the clarified liquid manure is then successively subjected to:

the nitrification treatment according to step (1) where this treatment has not been carried out beforehand;

the treatment for precipitation of the nitrates in accordance with steps (2) and (3).

The best precipitation yields of the nitrates have been obtained under these conditions.

Where appropriate, the solid matter is separated from the suspension obtained at the end of step (3), for example, by flocculation followed by filtration and/or settling and physical separation. There are collected, on the one hand, a filtrate depleted in nitrates, which takes the form of a clear, practically solution capable of being spread or of being used for irrigation, and, on the other hand, solid matter containing hydrated double or mixed calcium nitroaluminates, which finds application as a fertilizer. It has, in effect, been shown by means of agronomic experiments that the nitrate ions are temporarily trapped in the solid matter in the state of hydrated double or mixed calcium nitroaluminates, but remain available to and assimilated by plants.

A practical application of the process according to the invention for the treatment of liquid manure may be envisaged according to the following example of an installation on a pig farm.

INSTALLATION OF THE PROCESS

This consists in adapting and supplementing the existing installation by partitioning the liquid manure storage tank. After adaptation and supplementation, the new installation comprises a first compartment consisting of a nitrification tank N.

The nitrification tank N is equipped with a microbubble aeration system (production of air + diffusion).

This installation also comprises a reactor for the precipitation reaction of the nitrate ions in accordance with the process according to the invention, and a salt/effluent separation system (sieve type).

The installation may be supplemented with a pretreatment of the liquid manure before nitrification (settling and physical separation, or screening and/or flocculation) with the object of reducing the BOD and hence the oxygen consumption of the medium. The flocculation may be carried out using a weakly cationic polyacrylamide.

The second compartment of the existing storage tank, referred to as tank S, is used for storing the effluent obtained after separation of the nitrate ions.

OPERATION

The average input to the installation, in m$^3$ of crude liquid manure per day, is dependent on the number of pigs.

The pretreatment before nitrification produces:
organic sludge having a high percentage of dry matter. These sludge contain organic nitrogen and virtually all of the phosphorus; they are used as a humous-enriching agent on the farm.
the liquid manure to be treated having a small solid matter in suspension content.

NITRIFICATION

Feeding the nitrification tank N is carried out using liquid manure cleared of organic sludge.

The residence time is matched to the rate of nitrification.

TREATMENT

The sequences of the treatment are as follows:

At regular intervals, a certain volume V1 of nitrified liquid manure is withdrawn from the tank N to the reactor. At the same time, a certain volume V2 of nitrate-depleted final effluent may be transferred from the effluent storage tank S to the nitrification tank N in order to maintain a constant volume in the latter. The volumes V1 and V2 to be treated are then calculated so as to maintain a constant $NO_3$ concentration in the tank N and a constant level in the tank N; it enables an amount of nitrates equivalent to that formed during the period in question to be extracted from this tank.

In the reactor, the liquid manure to be treated is stirred and a suitable dose of active alumina and, if necessary, of calcium hydroxide is introduced.

The medium is kept stirring during the reaction. After the reaction, the suspension of nitrate salt is extracted from the reactor to a sieve in order to separate the salt from the effluent. It is also possible to separate the salt by a simple settling and physical separation operation.

The salt is stored while awaiting its use as a nitrogenous fertilizer. The effluent, depleted in nitrate (it generally does not contain more than 0.3 to 0.5 g/l of $NO_3$) and containing virtually all of the potassium in the liquid manure, is stored in the tank S; it is used as a fertilizer by sprinkling or by spreading.

According to a second embodiment of the invention, which is directed towards treatment of aqueous solutions comprising a high to moderate content of nitrate ions and small amounts of organic compounds such as industrial effluents or municipal waste water or regeneration solution of exchanger resins used in sewage plants, the following second variant of the process according to the invention is advantageously used:

1) One or more calcium aluminate(s) and, if necessary, calcium hydroxide and/or another basic agent to adjust the pH to a basic value, preferably to a value above 10.5, is/are added to the solution to be treated.
2) The precipitation reaction is performed with stirring and at room temperature.
3) At the end of this reaction, the suspension obtained is subjected to a settling and physical separation and/or filtration operation, after the addition of a flocculating agent where appropriate.
4) Then, if necessary, the filtrate obtained is neutralized, which also has the effect of precipitating the alumina in solution in the form of an insoluble hydroxide.
5) Lastly, the new suspension obtained is subjected to a settling and physical separation operation and/or filtration operation to obtain a purified water which can be discharged into the environment without risk of pollution.

If the nitrate content of this purified water is less than 50 mg per liter, and if it does not include other components or compounds at levels greater than those allowed in regulations, this water can be fed into drinking water distribution networks.

If the solution to be treated is a polluted water, such as a water originating from aquiculture or pisciculture or a municipal waste water containing ammoniacal nitrogen, an operation of nitrification of this solution, of the type presented above, is advantageously arranged.

During step (1), sodium hydroxide, potassium hydroxide or calcium hydroxide may be used as a basic agent.

Advantageously, the addition of a basic agent is performed prior to the addition of calcium aluminate. This results in a decrease in the concentration of cation which are only sparingly soluble in the form of insoluble hydroxides.

Advantageously, prior to the addition of calcium aluminate, an agent supplying the element calcium other than calcium aluminates is added to the solution to be treated. This results in a decrease in the concentration of anions which are only sparingly soluble in the form of calcium salts, such as sulfates, phosphates, carbonates, fluorides and the like.

Advantageously also, calcium hydroxide is chosen at the basic agent and agent supplying the element calcium, and is introduced prior to the calcium aluminate.

The solution then undergoes the treatment of removal of nitrate ions by precipitation after removal of the precipitated phases. These process variants enable the formation of other complex aluminates concomitantly with the mononitroaluminate to be limited.

In the precipitation steps, flocculating agents of natural origin such as alginates or xanthan gums are preferably chosen. However, salts such as ferric chloride or aluminium sulphate as well as polymers such as polyacrylamides are also suitable for the invention.

Advantageously, the residual sludges obtained in this variant of the process according to the invention at the end of step (3), when they are rich in calcium nitroaluminates, may be used as an enriching agent and fertiliser for agricultural soils. In effect, their content of sparingly soluble nitrate enables the nitrate fertiliser to be supplied at a rate proportional to its consumption by the plants, and thereby eliminates a source of pollution of groundwater and stream water. In addition, the alkalinity of these sludges can enable an acid soil to be corrected.

In the case where the filtrate is intended for the preparation of drinking water or for discharging into the environment, the filtrate [step (4)] is advantageously neutralised using $CO_2$ in order to precipitate calcium carbonate simultaneously with the aluminium hydroxide.

In accordance with the process according to the invention, apart from the agents needed for precipitation of the nitrates in solution, the solutions to be treated can receive crystallising agents having the property of influencing the kinetics of formation of the double or mixed nitroaluminates. These crystallising agents consist, for example, of at least one of the precipitated double or mixed nitroaluminates, taken alone or in combination.

Other features and advantages of the invention will become apparent on reading the examples which follow, given for the purpose of illustration and without implied limitation of the invention.

EXAMPLE 1 to 3

An aqueous solution containing calcium nitrate $Ca(NO_3)_2$ is introduced into a chemical reactor equipped with a magnetic stirrer: the initial $NO_3$ concentration varies between 500 mg per liter and 125 mg per liter. In these examples, the active alumina is calcium aluminate CA in aqueous solution. The additional supply of calcium is obtained by adding calcium hydroxide $Ca(OH)_2$.

The treatment is carried out by simultaneously adding CA and $Ca(OH)_2$. The treatment is carried out with stirring. The suspension obtained is filtered or treated with a flocculating agent and subjected to a settling and physical separation operation. Nitrate analysis is then performed with a specific electrode after adding a buffer and adjusting the pH to 5.5.

The other working conditions and the results for Examples 1 to 3 are recorded in Table 1 below.

TABLE I

|  | EXAMPLE 1 | EXAMPLE 2 | EXAMPLE 3 |
|---|---|---|---|
| Initial $NO_3$ concentration (mg/l) | 500 | 125 | 125 |
| Amount of CA in aqueous solution (mg/l) | 2844 | 711 | 355 |
| Amount of $Ca(OH)_2$ (mg/l) | 3696 | 925 | 425 |
| Overall mole ratio Al/$NO_3$ | 4.46 | 4.46 | 2.23 |
| Overall mole ratio Ca/$NO_3$ | 8.93 | 8.92 | 4.71 |
| Treatment period (min.) | 15 | 15 | 15 |
| Residual $NO_3$ concentration (mg/l) | 123 | 81 | 96 |
| Yield (%) | 75 | 35 | 23 |

EXAMPLES 4 to 6

The working conditions in these examples are identical to those in Examples 1 to 3, except for the agent supplying the element aluminium, which is in the form of $C_3A$.

The other working conditions and the results for these examples are given in Table II below:

TABLE II

|  | EXAMPLE 4 | EXAMPLE 5 | EXAMPLE 6 |
|---|---|---|---|
| Initial $NO_3$ concentration (mg/l) | 500 | 250 | 2300 |
| Amount of $C_3A$ (mg/l) | 4899 | 5000 | 5000 |
| Amount of $Ca(OH)_2$ | 0 | 0 | 0 |
| Overall mole ratio Al/$NO_3$ | 4.5 | 9.19 | 1.0 |
| Overall mole ratio Ca/$NO_3$ | 7.25 | 14.28 | 2.0 |
| Treatment period (min) | 350 (220) | 160 | 1100 |
| Residual $NO_3$ concentration (mg/l) | 86 (96) | 98 | 480 |
| Yield (%) | 83.4 (80.8) | 60.8 | 79.1 |

EXAMPLES 7 to 9

The working conditions in these examples are identical to those of Examples 1 to 3, except for the agent supplying the element aluminum, which is in the form of SECAR 71, an industrial refractory cement produced by LARARGE FONDU INTERNATIONAL. SECAR 71 is composed of approximately 70% of $Al_2O_3$, approximately 29% of CaO and various other oxides. The other working conditions and the results for these examples are given in Table III below:

TABLE III

|  | EXAMPLE 7 | EXAMPLE 8 | EXAMPLE 9 |
|---|---|---|---|
| Initial $NO_3$ concentration (mg/l) | 125 | 500 | 500 |
| Amount of SECAR 71 (mg/l) | 655 | 2620 | 2620 |
| Amount of $Ca(OH)_2$ (mg/l) | 1000 | 4000 | 2970 |
| Overall mole ratio $Al/NO_3$ | 4.46 | 4.46 | 4.46 |
| Overall mole ratio $Ca/NO_3$ | 8.91 | 8.91 | 7.19 |
| Treatment period (min) | 300 | 1020 | 1020 |
| Residual $NO_3$ concentration (mg/l) | 78 | 102 | 169 |
| Yield (%) | 37.6% | 79.6 | 66.2 |

EXAMPLES 10 and 11

The working condition in these examples are identical to those in Examples 1 to 3, except for the agent supplying the element aluminum, which is in the form of a product composed of 36% by weight of $C_3A$, 60% of $C_{12}A_7$, and 4% of calcium titanate. This product will be identified by M in the examples which follow.

The other working conditions and the results for these examples are given in the following Table IV:

TABLE IV

|  | EXAMPLE 10 | EXAMPLE 11 |
|---|---|---|
| Initial $NO_3$ concentration (mg/l) | 500 | 500 |
| Amount of M (mg/l) | 4390 | 4390 |
| Amount of $Ca(OH)_2$ (mg/l) | 0 | 965 |
| Overall mole ratio $Al/NO_3$ | 4.45 | 4.45 |
| Overall mole ratio $Ca/NO_3$ | 5.60 | 7.21 |
| Treatment period (min.) | 270 | 75 |
| Residual $NO_3$ concentration (mg/l) | 186 | 82 |
| Yield (%) | 62.8 | 83.6 |

It is observed that the increase in the overall mole ratio $Ca/NO_3$ by adding calcium hydroxide enables the yield to be substantially improved.

EXAMPLES 12 and 13

The working conditions in these examples are identical to those in Examples 1 to 3, except for the agent supplying the element aluminum, which is a product composed of 37% by weight of $C_3A$, 55% of $C_{12}A_7$ and 8% of calcium titanate. This product will be identified by N in the examples which follow.

The other working conditions and the results for these examples are given in the following Table V.

TABLE V

|  | EXAMPLE 12 | EXAMPLE 13 |
|---|---|---|
| Initial $NO_3$ concentration (mg/l) | 500 | 500 |
| Amount of N (mg/l) | 4390 | 4390 |
| Amount of $Ca(OH)_2$ (mg/l) | 0 | 965 |
| Overall mole ratio $Al/NO_3$ | 4.49 | 4.49 |
| Overall mole ratio $Ca/NO_3$ | 5.58 | 7.19 |
| Treatment period (min.) | 540 | 100 |
| Residual $NO_3$ concentration (mg/l) | 187 | 98 |
| Yield (%) | 62.6 | 80.4 |

It is observed that the increase in the overall mole ratio $Ca/NO_3$ by adding calcium hydroxide enables the yield to be substantially improved.

EXAMPLE 14

This example relates to the treatment of liquid manure.

The test liquid manure is a porcine liquid manure.

Nitrification is performed by aeration of the manure for 72 hours, by bubbling air through it in the presence of nitrifying microorganisms.

After nitrification, this liquid manure comprises an initial nitrate concentration equal to 3000 mg/liter. The suspended solid matter is precipitated by adding aluminum sulfate in the proportion of 0.3 g/liter of manure. After separation when settling has taken place, the supernatant liquid is treated by adding an active alumina and calcium hydroxide $Ca(OH)_2$ to this manure with stirring during 30 minutes. The suspension obtained is filtered and the residual nitrate content is measured on the filtrate after adding a buffer of ionic strength and adjusting the pH to 5.5.

The other working conditions and the results obtained are recorded in the following Table VI:

TABLE VI

|  | EXAMPLE 14 |
|---|---|
| Initial $NO_3$ concentration (mg/l) | 3000 |
| Amount of Cubic - T (mg/l) | 14,182 |
| Amount of $Ca(OH)_2$ (mg/l) | 3582 |
| Overall mole ratio $Al/NO_3$ | 2 |
| Overall mole ratio $Ca/NO_3$ | 3.5 |
| Treatment period (min.) | 30 |
| Residual $NO_3$ concentration (mg/l) | 600 |
| Yield (%) | 80 |

A prior precipitation of the suspended matter, especially that of a proteinaceous nature, enabled a good denitration yield to be obtained.

EXAMPLE 15

To an aqueous solution containing calcium nitrate in the proportion of 2000 mg/l of nitrate ions, 8.78 g of the calcium aluminate identified by the letter "N" in Examples 12 and 13 and 1.93 g of $Ca(OH)_2$ are added per liter of solution.

Under these conditions, the overall mole ratio $Al/NO_3$ is equal to 2.25 and the overall mole ratio $Ca/NO_3$ is equal to 3.6.

The change in the pH and in the concentration of nitrates in solution is monitored as a function of the reaction time using a specific electrode after adding a buffer and adjusting the pH to 5.5.

The results of these measurements are recorded in the following Table VII:

TABLE VII

| EXAMPLE 15 | | |
|---|---|---|
| Time (min.) | $(NO_3)$ (mg/l) | pH |
| 15 | 1251 | 12.00 |
| 30 | 1065 | 12.03 |
| 45 | 1005 | 12.04 |
| 75 | 754 | 12.00 |
| 105 | 579 | 11.87 |
| 135 | 521 | 11.82 |

The yield of the precipitation reaction of the nitrate ions after 135 minute's reaction is 75%.

EXAMPLE 16

To an aqueous solution containing 1608 mg per liter of nitrate, 8.78 g per liter of the calcium aluminate identified by the letter "N" in Examples 12 and 13 and 1.93 g per liter of Ca(OH)$_2$ are added.

After five minutes' reaction, 5 g of hydrated calcium mononitroaluminate—3CaO.Al$_2$O$_3$.CA(NO$_3$)$_2$.nH$_2$O—containing 46% by weight of dry extract are added.

Under the conditions of this test, the overall mole ratio Al/NO$_3$ is equal to 2.8 and the overall mole ratio Ca/NO$_3$ is equal to 4.5.

The change in the pH and in the nitrate concentration is monitored as a function of the reaction time according to the method of measurement used in the previous example.

The results are recorded in the following Table VIII:

TABLE VIII

| | EXAMPLE 16 | |
|---|---|---|
| Time (min.) | (NO$_3$) (mg/l) | pH |
| 15 | 438 | — |
| 30 | 289 | 11.82 |
| 45 | 241 | 11.85 |
| 60 | 171 | 11.79 |
| 90 | 123 | 11.80 |
| 150 | 93 | 11.75 |

The yield of the precipitation reaction of the nitrate ions is equal to 94% after 150 minutes.

EXAMPLE 17

This example relates to a treatment of porcine liquid manure.

In a first step, a clarification of the manure is carried out by removing the solid matter. For this purpose, a flocculation is performed by adding a polyacrylamide of trade name PROSEDIM CS 284 in the proportion of 75 mg/l to precipitate the proteinaceous matter and phosphates, and the solid matter is removed after settling has taken place. The clarified supernatant is then nitrified.

Nitrification is carried out by aeration and inoculation of the liquid manure to be treated by adding a liquid manure undergoing nitrification and hence containing nitrifying microorganisms.

After nitrification, this manure includes an initial nitrate concentration equal to 2737 mg/l.

The nitrates are precipitated in the form of calcium mononitroaluminate by adding calcium aluminate identified by the letter "N" in Examples 12 and 13, as well as Ca(OH)$_2$.

At regular intervals during the reaction, the suspension obtained is filtered and the residual contents of nitrate, chloride ions, phosphate ions HPO$_4^{2-}$ and sulphate ions SO$_4^{2-}$ are measured on the filtrate by ion chromatography.

To carry out the precipitation, 11,853 mg/l of calcium aluminate designated by the letter "N" and 4215 mg/l of Ca(OH)$_2$ are added. Under these conditions, the overall mole ratio Al/NO$_3$ is equal to 2.25 and the overall mole ratio Ca/NO$_3$ is equal to 3.6.

The results of this test are given in the following

TABLE IX

| Time (min) | Cl$^-$ (mg/l) | NO$_3^-$ | HPO$_4^=$ | SO$_4^=$ | Yield (%) |
|---|---|---|---|---|---|
| 0 | 384 | 2737 | 204 | 506 | — |
| 15 | 342 | 2400 | 0 | 84 | 12 |
| 30 | 469 | 2018 | 0 | 0 | 26 |
| 45 | 324 | 1515 | 0 | 153 | 45 |
| 60 | 455 | 1129 | 0 | 59 | 59 |
| 75 | 448 | 934 | 0 | 32 | 66 |
| 90 | 262 | 752 | 0 | 0 | 72 |
| 105 | 405 | 688 | 0 | 0 | 75 |
| 135 | 224 | 553 | 0 | 0 | 80 |
| 165 | 399 | 520 | 0 | 12 | 81 |
| 195 | 213 | 501 | 0 | 0 | 82 |
| 225 | 195 | 470 | 0 | 0 | 83 |

The results of chemical analyses of the nitrified liquid manure before and after precipitation of the nitrates are given in the following Table X:

| CHEMICAL ANALYSES (mg/l) | | |
|---|---|---|
| | Nitrified liquid manure before separation of the nitrates by precipitation | Final effluent obtained after precipitation of the nitrates and separation of the precipitate |
| Al | 5.3 | 31.7 |
| Ca | 427.6 | 191.6 |
| K | 831.8 | 760.8 |
| Na | 148.4 | 150.8 |
| Cu | 3 | 0.035 |
| Zn | 12.5 | nd* |
| Ni | 0.21 | 0.01 |
| Pb | 0.09 | nd* |
| W | 0.09 | nd* |
| Co | 0.06 | nd* |
| CD | 0.06 | nd* |
| NO$_3$ | 2737 | 470 |
| NH$_4$ | nd* | nd* |
| Cl | 384 | 195 |
| P$_2$O$_5$ | 89 | nd* |
| SO$_4$ | 506 | nd* |
| pH | 5.8 | 12.2 |
| | | Analysis of the precipitate (weight %) |
| Al$_2$O$_3$ | | 18.00 |
| CaO | | 39.71 |
| K$_2$O | | 0.26 |
| Na$_2$O | | nd* |
| NO$_3$ | | 9.14 |
| H$_2$O | | 31.71 |

*nd means non-detectable

Apart from a substantial removal of the nitrates by means of the process according to the invention, it will be noted that the proportions of the elements Cu and Zn in the effluent are quite negligible. These elements are, in effect, advantageously bound in the precipitate.

The final effluent, depleted in nitrates, may be spread in nature without risk of pollution. The nitrate-rich precipitate is advantageously used as fertilizer, and spread at the time when the growth of the plants requires a supply of nitrogen.

EXAMPLE 18 AND 19

An aqueous solution containing calcium nitrate Ca(NO$_3$)$_2$ at a concentration of 125 mg/l of nitrate ions is introduced into a chemical reactor equipped with a magnetic stirrer. The agent supplying the element aluminum is sodium aluminate NaAlO$_2$ in aqueous solution. The additional supply of calcium is provided by adding calcium hydroxide Ca(OH)$_2$.

The treatment is carried out by simultaneously adding $NaAlO_2$ and $Ca(OH)_2$. The treatment is carried out with stirring. The suspension obtained is filtered or treated with a flocculating agent and subjected to a settling and physical separation operation. The nitrate analysis is performed with a specific electrode.

The other working conditions and the results from these examples are given in the following Table XI.

TABLE XI

|  | EXAMPLE 18 | EXAMPLE 19 |
|---|---|---|
| Initial $NO_3$ (mg/l) | 125 | 125 |
| $NaAlO_2$ in the solution (mg/l) | 2950 | 1475 |
| $Ca(OH)_2$ (mg/l) | 5255 | 2590 |
| Mole ratio $Ca/NO_3$ | 35 | 17.5 |
| Mole ratio $Al/NO_3$ | 18 | 9 |
| Treatment period (min) | 15 | 15 |
| Residual $NO_3$ (mg/l) | 62 | 114 |
| Yield (%) | 50 | 8 |

EXAMPLES 20 TO 21

A reagent to eliminate nitrate ions in the state of hydrated calcium nitroaluminate, double or mixed, is added to an aqueous solution containing 300 mg/liter of nitrate and corresponding to the supernatant liquid obtained after nitrification and precipitation of the suspended solid matter of the manure presented in Example 14.

After reaction, the obtained suspension filtered and the residual nitrate content is measured on the filtrate.

The other working condition and the obtained results are reported in the following Table XII.

TABLE XI

|  | EXAMPLE 20 | EXAMPLE 21 |
|---|---|---|
| Amount of added pure C3A (mg/l) | 29.7 | 0 |
| Amount of added $Ca(OH)_2$ (mg/l) | 3.5 | 0 |
| Amount of added C4A(C3A.CaO) | 0 | 35.3 |
| Overall mole ratio $Al/NO_3$ (mg/l) | 2 | 2 |
| Overall mole ratio $Ca/NO_3$ | 3.5 | 4 |
| Treatment period (min) | 180 | 90 |
| Residual $NO_3$ concentration (mg/l) | 572 | 410 |
| Yield (%) | 81 | 86 |

EXAMPLES 22 TO 24

Aqueous solution polluted by nitrate ions and other ions are purified by using the reagent identified by "M" in Examples 10 and 11.

Examples 22 to 24 have been made with aqueous solution containing, before treatment, a majority of 3 g/l of $NO_3$.

The purification method is the same for each of these examples, that is:
overall mole ratio $Al/NO_3 = 2$
overall mole ratio $Ca/No_3 = 4$.

In the following Table XIII arc reported the other ions which are in high proportion in the solution to be treated as well as the purification results.

| Example | Nature of the ions Y in high proportion | Amount of Y (mg/l) | Treatment period (mg/l) | Yield of epuration in $NO_3$ | Yield of epuration in Y |
|---|---|---|---|---|---|
| 22 | Chloride | 1000 | 120 | 70% | 52% |
| 23 | Phosphate | 1000 | 120 | 78% | 100% |
| 24 | Sulfate | 1000 | 120 | 68% | 99% |

The entire disclosure of all applications, patents, and publications, cited above and below, and of corresponding French Application 91/00260, are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the purification of aqueous solutions polluted by nitrate ions, comprising precipitating hydrated double or mixed calcium nitroaluminates, by adding to the solutions to be treated at least one agent supplying the element aluminum and at least one agent supplying the element calcium, the overall mole ratio of the element aluminum to nitrate, $Al/NO_3$, being higher than 1 and the overall mole ratio of calcium to nitrate, $Ca/NO_3$, being higher than 2, and conducting the precipitation reaction with stirring at basic pH.

2. A process according to claim 1, wherein the calcium nitroaluminate is hydrated calcium mononitroaluminate.

3. A process according to claim 1, wherein the precipitation reaction is performed at room temperature, about 20°–25° C.

4. A process according to claim 1, wherein the precipitation reaction is performed at a pH above 10.5.

5. A process according to claim 1, wherein the agent supplying the element aluminum is an alkali metal aluminate.

6. A process according to claim 1, wherein the agent supplying the element aluminum is a calcium aluminate.

7. A process according to claim 2, wherein the agent supplying the element aluminum is a calcium aluminate.

8. A process according to claim 6, wherein the agent supplying the element aluminum comprises at least one of $(CaO)_3Al_2O_3$ and $(CaO)_{12}(Al_2O_3)_7$.

9. A process for the treatment of solutions and suspensions containing nitrogen in ammoniacal form, said solution optionally containing solid matter, wherein the following steps are performed successively:

(1) the conversion to nitrates of the ammoniacal nitrogen present in the solutions to be treated is performed biochemically in the presence of nitrifying bacteria and oxygen;

(2) then, once the majority of the ammoniacal nitrogen is converted to nitrates, at least one calcium aluminate is added to the solution to be treated, so that the overall mole ratio of the element aluminum to nitrate, $Al/NO_3$, is higher than 1 and that the overall mole ratio of the element calcium to nitrate is higher than 2, and, optionally, a basic agent is added to adjust the pH to a basic value, and the precipitation reaction is performed with stirring and at room temperature;

(3) after separation, a thick suspension or a solid is collected, which is suitable as an enriching agent and fertilizer for agricultural soils; and (4) finally, a liquid effluent depleted in nitrates is collected.

10. A process according to claim 9, wherein the solution to be treated is brought to a basic pH by adding potassium hydroxide.

11. A process according to claim 9, wherein said solution contains solid matter and before the precipitation of hydrated double or mixed calcium nitroaluminates, either before or after the nitrification step (1), the solid matter included in the solution to be treated is separated at least partially from the solution.

12. A process according to claim 11, wherein the separation is conducted by flocculation followed by a filtration operation and/or settling.

13. A process according to claim 11, wherein the separation of the solid matter is performed before the nitrification step (1).

14. A process according to claim 1, wherein the solution to be treated is a water polluted with nitrates, comprising adding to the solution to be treated:

(1) at least one calcium aluminate and, optionally, a basic agent to adjust the pH to a basic value, such that the mole ratio of the element aluminum to nitrate, $Al/NO_3$, is higher than 1 and that the overall mole ratio of calcium to nitrate, $Ca/NO_3$, is higher than 2;

(2) conducting the precipitation reaction with stirring and at room temperature;

(3) after the precipitation reaction, subjecting resultant suspension to a separation step to remove solids from the solution;

(4) optionally, neutralizing resultant solidsdepleted solution to precipitate the aluminum in solution in the form of an insoluble hydroxide; and (5) separating resultant insoluble hydroxide from the resultant suspension to obtain a purified water which can be discharged into the environment.

15. A process according to claim 14, wherein the solution to be treated is a polluted water originating from agriculture or a municipal waste water containing water-soluble compounds containing ammoniacal nitrogen and wherein, prior to removal of the nitrates, the solution is subjected to nitrification.

16. A process according to claim 14, wherein prior to adding of calcium aluminate, a basic agent is added to decrease the concentration of cations which are only sparingly soluble in the form of hydroxides.

17. A process according to claim 14, wherein prior to the addition of calcium aluminate, an agent supplying the element calcium is added to decrease the concentration of anions which are only sparingly soluble in the form of calcium salts.

18. A process according to claim 16, wherein prior to the addition of calcium aluminate, an agent supplying the element calcium is added to decrease the concentration of anions which are only sparingly soluble in the form of calcium salts.

19. A process according to claim 18, wherein the anions which are only sparingly soluble in the form of calcium salts and the cations which are only sparingly soluble in the form of hydroxides are decreased simultaneously by adding calcium hydroxide.

20. A process according to claim 14, wherein the solution obtained at the end of step (4) is neutralized with $CO_2$.

21. A process according to claim 1, wherein the solution to be treated is selected from municipal wastewater and industrial effluents.

22. A process according to claim 9, wherein the solution to be treated is liquid manure.

23. A process according to claim 3, wherein the precipitation reaction is conducted at about 20° C.

24. A process according to claim 9, wherein the effluent which is depleted in nitrate does not contain more than 0.3 g/l nitrate.

25. A process according to claim 9, wherein the effluent which is depleted in nitrate does not contain more than 0.5 g/l nitrate.

26. A process according to claim 12, wherein flocculation is conducted with a flocculating agent selected from the group consisting of alginates, xanthan gum, ferric chloride, aluminum sulfate, and polyacrylamide.

27. A process according to claim 9, wherein the effluents to be treated comprise suspended solid matter.

28. A process according to claim 1 wherein said agent supplying calcium is calcium aluminate and hydrated double-or mixed calcium nitroaluminate is added in a proportion of 10% to 50% by weight relative to the weight of said calcium aluminate to initiate the precipitation reaction.

29. A process according to claim 9, wherein manure is the material to be treated by the process and wherein the liquid effluent obtained in step (4) is clear, decolorized and deodorized.

30. A process according to claim 9, wherein the material to be treated by the process contains at least one undesirable cation and wherein the effluent obtained in step (4) contains a lower concentration of said at least one undesirable cation than the material to be treated.

31. A process according to claim 14, wherein the solution to be treated by the process is a water polluted with nitrates and wherein the purified water obtained in step (5) is clear, decolorized and deodorized.

32. A process according to claim 14, wherein the material to be treated by the process contains at least one undesirable cation and wherein the effluent obtained in step (5) contains a lower concentration of said at least one undesirable cation than the material to be treated.

* * * * *